Sept. 15, 1959 F. OSTWALD 2,904,069
PRESSURE REGULATOR FOR HARMONIC PRESSURE DISTRIBUTION
Filed Oct. 3, 1955 2 Sheets-Sheet 1

INVENTOR.
FRITZ OSTWALD

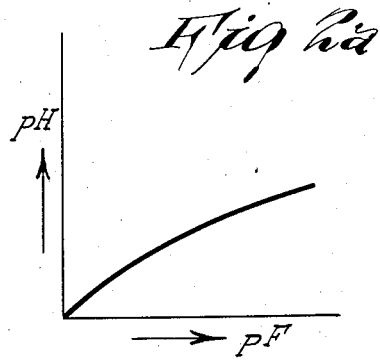
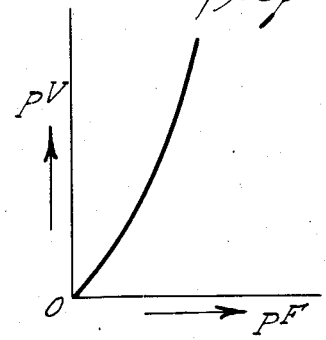
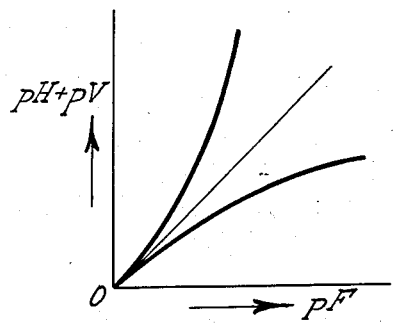
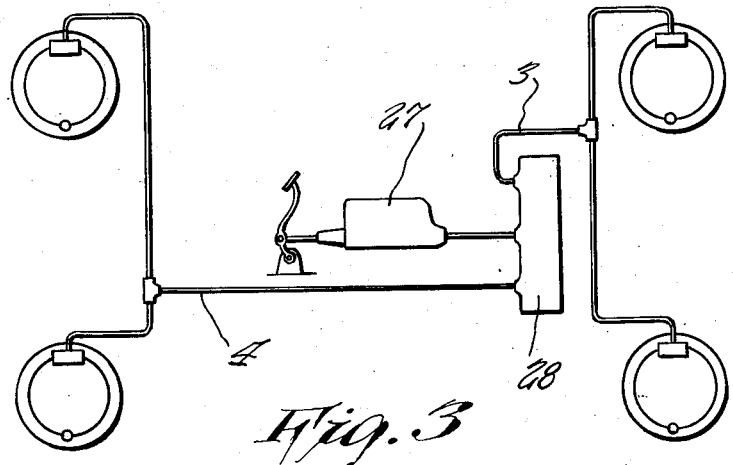

2,904,069

PRESSURE REGULATOR FOR HARMONIC PRESSURE DISTRIBUTION

Fritz Ostwald, Heppenheim, Bergstrasse, Germany, assignor to Alfred Teves Maschinen- und Armaturenfabrik KG, Frankfurt am Main, Germany Application October 3, 1955, Serial No. 538,195

Claims priority, application Germany October 2, 1954

3 Claims. (Cl. 137—506)

The invention relates to a pressure regulator for harmonic pressure distribution. There are known pressure regulators which operate to regulate the pressure in one line of a system as a function of the varying pressure in another branch of the main. In this kind of regulator, there is a non-linear functional relationship between the sum of the pressures in the branches and the pressure in the main.

One field of application for such regulators is that of vehicle brakes. It will be seen that a pressure regulator installed in a brake system and allowing for the increased load on the front wheels due to dynamic axle load displacement by cutting down the brake pressure on the rear wheels will fail to bring about a linear relationship between the force of the foot on the brake pedal and the sum of the braking moments on all wheels, i.e. the deceleration of the vehicle, as would be approximately the case under uniform braking force distribution without pressure regulator. A non-linear functional relationship is deemed to be disadvantageous in this situation.

A harmonic pressure distribution, i.e. a pressure distribution in which a linear relationship in the above sense is established, is achieved by the device according to the invention. The regulator according to the invention makes it possible upon increase in pressure in the main line for the pressure in one branch line to be diminished by the same proportion by which the pressure in the other branch line is augmented relative to a pressure lower than that in the main line. The proposed construction of the regulator is such that between a main line and each of two branch lines formed by dividing the main, a sliding control element under spring action, whose closure is effected by a piston under spring action and capable of being displaced under the action of pressure in the corresponding branch line. The two regulating elements, according to the invention, are united in a single housing. Unlike other pressure regulators, the device according to the invention regulates the pressure in two lines. By suitable choice of spring characteristics and effective areas of the control elements, it is possible thereby to establish a linear relationship between the sum of the branch line pressures and the main line pressure.

The device according to the invention will now be more fully described with reference to the accompanying drawings, but it should be understood that these are given by way of illustration and not of limitation and that many changes in the details may be made without departing from the spirit of the invention.

In the drawings,

Fig. 2 shows regulator or distribution diagrams;

Figure 1:
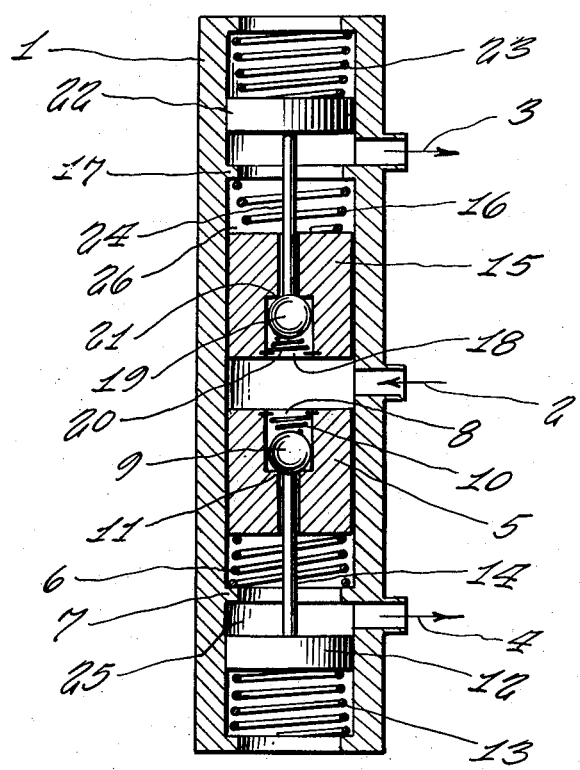
Fig. 1 shows a sectional view of one embodiment of the pressure regulator according to the invention.

Fig. 3 schematically shows an installation in a vehicle.

Referring to Fig. 1, in a housing 1 an inlet 2 communicates with two outlets 3 and 4. On either side of the inlet 2, the housing 1, which is cylindrical, contains slidable control elements 5, 15 backed up by springs 6, 16 resting against shoulders 7, 17 provided on the wall of the cylindrical housing 1. Control elements 5, 15 each have a bore 8, 18 in which a closure member 9, 19, a ball in the embodiment shown, is freely movable or subject to the action of a weak spring 10, 20. The bores 8, 18 are fashioned at 11, 21 into valve seats for the closure members 9, 19. Beyond the outlets 3 and 4, the housing 1 is fitted with slidable pistons 12, 22, supported against the wall of the housing by means of springs 13, 23. Springs 13, 23 may be prestressed as required from without by means of adjusting screws not shown. Pistons 12, 22 bear pins 14, 24 capable of lifting closure members 9, 19 from their seats 11, 21.

The mode of operation of the control element 5, 15 on either side is as follows. In rest position, the closure members 9, 19 rest on seats 11, 21. Upon rise of pressure at the inlet tube, control elements 5, 15 are displaced against the action of springs 6, 16. This displacement lifts the closure members 9, 19 from their seats and establishes communication between inlet 2 and outlets 4, 3. The pressure at inlet 2 is thus propagated into spaces 25, 26. The pressure in the latter acts on pistons 12, 22 and displaces them against the action of springs 13, 23. The air displaced behind the piston escapes into the open. With the displacement of pistons 12, 22, pins 14, 24 also move, and closure members 9, 19 drop onto their seats 11, 21 under the action of the pressure or of weak springs 10, 20.

Now in the arrangement according to the invention, the two control branches are provided with a special distribution of linear and progressive spring elements. Springs 6 and 23 have progressive (quadratic) characteristics, while springs 16 and 13 have a linear characteristic. In spring elements with quadratic characteristics, the force required for low compression is less, and that required for high compression is greater, than the force required to compress a spring with linear compression. The characteristic curve is a property of any spring element showing as it does the displacement as well as the relationship between the pressure exerted as a function of force on the spring element and the resulting shortening of the latter. The characteristic curve thus provides a sample measure for the purpose of indicating how great the force must be to impart a given displacement to a piston acted upon by the spring. Thus, it is possible, according to the design of the spring element, to assign various piston displacements to given pressure increments.

Theoretically, a distinction is made between spring characteristics of linear and non-linear or curvilinear form. In spring characteristics of linear form, there is a constant proportionality between the pressure increment and the shortening, regardless of the extent to which the spring may already have been compressed. It is otherwise with springs of non-linear characteristics. If, out of the totality of possible spring elements we select one having a quadratic characteristic, the characteristic curve will be a quadratic parabola and not a straight line. Then we consequently have a variable proportionality between pressure increment and shortening of the spring, so that it is no longer true that regardless of the previous degree of stress, a pressure increment of like magnitude will produce a shortening of the spring element by a like amount; on the contrary, the shortening due to a pressure increment at small absolute stress will be great, diminishing as the absolute stress increases, as a function of the previous degree of stress in accordance with the parabolic form of the characteristic curve, of course on the assumption of equal pressure increments.

If we refer to the embodiment according to the application and suppose for example that the supporting spring 6 of control means 5 has a curvilinear, in particular quadratic characteristic, and the supporting spring 13 of piston 12 a linear characteristic, then a displacement of control means 5 will be opposed by a progressively increasing force, so that with increasing main cylinder pressure a progressively increasing pressure increment will be needed to open the valve and permit flow to the branch 4, while the supporting spring with linear characteristic will shut off the piston connection again at a constant pressure increment, regardless of the magnitude of the main cylinder pressure. In this way, the proportion of the pressure in branch 4 to that of the main 2 will be diminished with increasing main cylinder pressure. Now, if contrariwise spring 6 has a linear, and spring 13 a progressive characteristic (as is true of springs 16 and 23, for example), then a displacement of piston 12 will be opposed by a progressively increasing force, while the force required per mm. to displace the control means will remain constant, so that finally the control means will actually be displaced relative to the piston. In this way, a connection is maintained between branch 3 and main 2, so that there is equality of pressure in these lines. For diminution of the pressure ratio between branch and main as a function of the pressure in the main, a spring with progressive characteristic is to be taken as supporting spring for the control means, and a linear one for the piston. But, if the pressure ratio is to increase with increasing main cylinder pressure until equality of pressures prevails between main 2 and branch 3, then the springs should be interchanged. By suitable combination of spring elements with linear and progressive characteristics, any desired pressure function can be obtained.

The effect of the arrangement according to the invention is as follows.

(1) First as to the relationship between the pressures at main inlet 2 and branch outlet 4. The force of spring 6, increasing progressively with increasing displacement to the left, assumes a larger and larger share of the main pressure acting on element 5, so that the pressure in space 25 is unable to exceed the value predetermined by the strength of the linear spring 13 and the effective area of control element 11.

These conditions are illustrated in Fig. 2a, in which pH stands for the brake pressure at the rear wheels and pF for that of the foot pedal.

(2) As to the line from main inlet 2 to branch outlet 3, with increasing pressure the progressively increasing force of spring 23 progressively diminishes the displacement of piston 22, so that ultimately only element 15 is moving relative to pin 24, and equality of pressure is established between the main inlet 2 and the branch outlet 3. See illustration in Fig. 2b, in which pV designates the brake pressure at the front wheels.

Then if the springs with curved characteristic are alike, and those with linear characteristic also, and if these are distributed asymmetrically as described, the result is that the sum of the branch line pressures will be a linear function of the pressure applied to the main line (compare Fig. 2c).

An application of the device according to the invention to automotive brakes is illustrated in Fig. 3. A conventional main cylinder 27 sets up a fluid pressure in the brake system, and this pressure is communicated to a pressure regulator 28 serving for distribution of braking force, which passes it on to the branch lines 3 and 4 in dependence on the magnitude of dynamic axle-load displacement. The branch line from outlet 3 of the embodiment described above by way of example passes to the front wheel brake cylinder, and the branch line from outlet 4 to the rear wheel brake cylinders. When a pressure regulator according to the invention is installed in a brake system, a linear relationship between brake pedal force and the braking moments on all wheels is achieved.

What I claim is:

1. A pressure regulator for fluid media in a system having a main line and branch lines, said regulator comprising means for stepping down the pressure in one branch line relative to the pressure in said main line, said means comprising an annular housing provided with a single inlet port, centrally thereof, a first outlet port in the first end portion of the said housing, a second outlet port in the second end portion thereof, a pair of shoulders in said housing arranged between said inlet port and said first and second outlet ports, control elements slidably movable in each of said end portions of the said housing between the inlet port and said shoulders provided with longitudinal bores therethrough and formed with valve seats adjacent said inlet port, closure members received in said valve seats, a piston slidable in each of said end portions of said housing adjacent said outlet ports, each of said outlet ports being disposed between its respective piston and an adjacent control element, a pin secured to each of said pistons and slidably movable in the said bores of said control elements for lifting the said closure members, a first pair of springs, one of said springs having a linear, the other one a progressive characteristic, each of said springs mounted in each of said end portions of said housings for urging said pistons, said pins and said closure members towards the center of said housing, a second pair of springs, one of them with progressive, the other one with linear characteristic, said springs biasing said slidable control elements away from said shoulders, one spring of progressive and one spring of linear characteristic out of said pairs mated with the control elements and pistons of one branch line, a third pair of springs, each of said springs urging their said respective closure members into their said respective valve seats.

2. Pressure regulator according to claim 1 wherein the housing is formed cylindrically on its inner surface throughout.

3. Pressure regulator according to claim 2 wherein the control elements and pistons are of cylindrical shape.

References Cited in the file of this patent

UNITED STATES PATENTS 2,634,743     Audemar _____ Apr. 14, 1953